United States Patent
Yoo et al.

(10) Patent No.: US 8,890,828 B2
(45) Date of Patent: Nov. 18, 2014

(54) DIGITIZER

(71) Applicant: Samsung Electro-Mechanics Co., Ltd., Gyunggi-do (KR)

(72) Inventors: Dong Sik Yoo, Gyunggi-do (KR); Kyoung Soo Chae, Gyunggi-do (KR); Hee Bum Lee, Gyunggi-do (KR); Ho Yun Cho, Gyunggi-do (KR); Yun Ki Hong, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 104 days.

(21) Appl. No.: 13/659,469

(22) Filed: Oct. 24, 2012

(65) Prior Publication Data

US 2014/0035838 A1 Feb. 6, 2014

(30) Foreign Application Priority Data

Aug. 3, 2012 (KR) ........................ 10-2012-0085271

(51) Int. Cl.
*G06F 3/041* (2006.01)
*G06F 3/046* (2006.01)
*G06F 3/0354* (2013.01)

(52) U.S. Cl.
CPC ............ *G06F 3/046* (2013.01); *G06F 3/03545* (2013.01)

USPC .......................................... 345/173

(58) Field of Classification Search
None
See application file for complete search history.

(56) References Cited

U.S. PATENT DOCUMENTS

| 4,697,244 | A | * | 9/1987 | Murakami et al. | 345/173 |
| 4,868,351 | A | * | 9/1989 | Watanabe et al. | 178/19.03 |
| 5,120,907 | A | * | 6/1992 | Shinbori et al. | 178/18.07 |
| 5,214,427 | A | * | 5/1993 | Yano | 341/20 |
| 7,423,629 | B2 | * | 9/2008 | Oda et al. | 345/156 |
| 7,812,268 | B2 | * | 10/2010 | Ely | 178/18.03 |
| 7,875,814 | B2 | * | 1/2011 | Chen et al. | 178/18.07 |
| 8,674,967 | B2 | * | 3/2014 | Fukushima et al. | 345/179 |
| 2004/0223089 | A1 | | 11/2004 | Hong et al. | |

* cited by examiner

*Primary Examiner* — Jason Olson
(74) *Attorney, Agent, or Firm* — Ladas & Parry, LLP

(57) ABSTRACT

Disclosed herein is a digitizer including: an input unit having a magnetic field shielding part embedded therein; a driving coil supplied with current to induce a magnetic line of force; a sensing coil to which voltage is induced by the magnetic line of force; and a control unit supplying current to the driving coil and measuring voltage induced to the sensing coil, wherein the control unit senses variation of voltage induced to the sensing coil to calculate coordinates of the input unit when the voltage induced to the sensing coil is changed by the magnetic field shielding part.

11 Claims, 4 Drawing Sheets

DIGITIZER

CROSS REFERENCE TO RELATED APPLICATION

This application claims the benefit of Korean Patent Application No. 10-2012-0085271, filed on Aug. 3, 2012, entitled "Digitizer", which is hereby incorporated by reference in its entirety into this application.

BACKGROUND OF THE INVENTION

1. Technical Field

The present invention relates to a digitizer.

2. Description of the Related Art

In accordance with the growth of computers using a digital technology, devices assisting computers have also been developed, and personal computers, portable transmitters and other personal information processors execute processing of text and graphics using a variety of input devices such as a keyboard and a mouse.

While the rapid advancement of an information-oriented society has widened the use of computers more and more, it is difficult to efficiently operate products using only a keyboard and a mouse currently serving as an input device. Therefore, the necessity for a device that is simple, has minimum malfunction, and is capable of easily inputting information has increased.

In addition, current techniques for input devices have progressed toward techniques related to high reliability, durability, innovation, designing and processing beyond the level of satisfying general functions. To this end, an electromagnetic induction type digitizer has been developed as an input device capable of inputting information such as text, graphics, or the like.

An example of an input device capable of performing a function similar to the electromagnetic induction type digitizer may include a capacitive type touch screen. However, the capacitive type touch screen cannot accurately sense coordinates and cannot also recognize writing pressure, as compared to the electromagnetic induction type digitizer. Therefore, the electromagnetic induction type digitizer has better precision or accuracy than the capacitive type touch screen.

However, like Patent Document described in the following Prior Art Document, the digitizer according to the prior art requires a pen for a digitizer, wherein the pen for a digitizer needs to include a coil generating current by receiving magnetic field applied thereinto and using the generated current to again generate magnetic field and a capacitor charging and discharging current generated from the coil. Therefore, the digitizer according to the prior art is heavy and thick, which causes inconvenience for uses and is hardly embedded in mobile devices.

PRIOR ART DOCUMENT

Patent Document (Patent Document 1) US2004-0223089 A1

SUMMARY OF THE INVENTION

The present invention has been made in an effort to provide a digitizer capable of calculating coordinates even when using stylus pen (input unit) that does not have complicated internal components such as a coil, a capacitor, and the like.

According to a preferred embodiment of the present invention, there is provided a digitizer, including: an input unit having a magnetic field shielding part embedded therein; a driving coil supplied with current to induce a magnetic line of force; a sensing coil to which voltage is induced by the magnetic line of force; and a control unit supplying current to the driving coil and measuring voltage induced to the sensing coil, wherein the control unit senses variation of voltage induced to the sensing coil to calculate coordinates of the input unit when the voltage induced to the sensing coil is changed by the magnetic field shielding part.

The input unit may be a stylus pen.

The magnetic field shielding part embedded in the input unit may be a conductor.

The conductor may be formed of any one selected from Cu, Fe, Ni, Al, Sn, Zn, Au, and Ag or an alloy of at least two thereof.

Current supplied to the driving coil by the control unit may be alternating current.

The driving coil and the sensing coil may vertically intersect each other.

The driving coil may be disposed in plural so as to be parallel with each other based on a first axis direction, and the sensing coil may be disposed in plural so as to be parallel with each other based on a second axis direction vertical to the first axis direction.

The control unit may sequentially supply current to the plurality of driving coils along the second axis direction and sequentially induce the magnetic line of force to the plurality of driving coils along the second axis direction.

The control unit may measure the voltage sequentially induced to the plurality of sensing coils along the first axis direction.

The control unit may set the voltage induced to the sensing coil as a reference value before the voltage induced to the sensing coil is changed by the magnetic field shielding part, and when the voltage induced to the sensing coil is changed by the magnetic field shielding part, compare the voltage with the reference value to sense variation of the voltage induced to the sensing coil.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
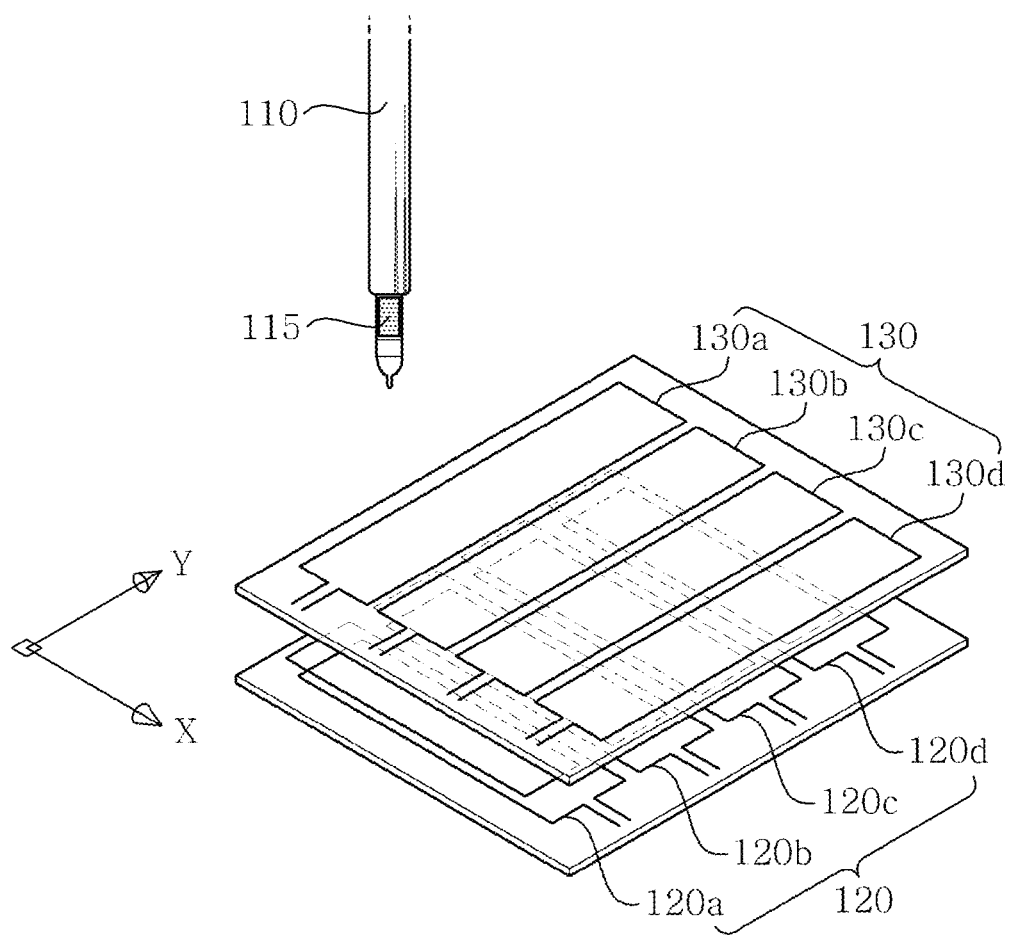
FIG. 1 is a diagram showing a digitizer according to a preferred embodiment of the present invention.

The objects, features and advantages of the present invention will be more clearly understood from the following detailed description of the preferred embodiments taken in conjunction with the accompanying drawings. Throughout the accompanying drawings, the same reference numerals are used to designate the same or similar components, and redundant descriptions thereof are omitted. Further, in the following description, the terms "first", "second", "one side", "the other side" and the like are used to differentiate a certain component from other components, but the configuration of such components should not be construed to be limited by the terms. Further, in the description of the present invention, when it is determined that the detailed description of the related art would obscure the gist of the present invention, the description thereof will be omitted.

Hereinafter, preferred embodiments of the present invention will be described in detail with reference to the attached drawings.

FIG. 1 is a diagram showing a digitizer according to a preferred embodiment of the present invention.

As shown in FIG. 1, a digitizer according to a preferred embodiment of the present invention may include an input unit 110 in which a magnetic field shielding part 115 is embedded, a driving coil 120 supplied with current to induce a magnetic line of force, a sensing coil 130 to which voltage is induced by the magnetic line of force, and a control unit supplying current to the driving coil 120 and measuring voltage induced to the sensing coil 130. In this case, the control unit senses variation of voltage induced to the sensing coil 130 to calculate coordinates of an input unit 110 when the voltage induced to from the sensing coil 130 is changed by the magnetic field shielding part 115.

The input unit 110 may be, for example, a stylus pen and serves to indicate coordinates.

Here, the input unit 110 may have the magnetic field shielding part 115 embedded therein. In detail, the magnetic field shielding part 115 may be a conductor capable of shielding magnetic field. In this case, the conductor may be formed of any one selected from Cu, Fe, Ni, Al, Sn, Zn, Au, and Ag or an alloy of at least two thereof.

The digitizer according to the prior art includes the input unit having complicated internal components, such as a coil, a capacitor, and the like, embedded therein, while the digitizer according to the preferred embodiment of the present invention includes the input unit 110 having the magnetic field shielding part 115 embedded therein. Therefore, the digitizer according to the preferred embodiment of the present invention includes the input unit 110 that can be manufactured lightly and thinly. As described above, the input unit 110 including the magnetic field shielding part 115 embedded therein may indicate coordinates by allowing the magnetic field shielding part 115 to shield the magnetic line of force induced from the driving coil 120 to be described below, which will be described below.

The driving coil 120 serves to supply the magnetic line of force to the sensing coil 130. In detail, the driving coil 120 having a closed curve form is supplied with current from the control unit to induce the magnetic force of line in a direction of the sensing coil 130. As described above, the magnetic line of force induced from the driving coil 120 serves to induce voltage to the sensing coil 130 and voltage (induced electromotive force) induced to the sensing coil 130 is in proportion to variation to time of the magnetic force of line induced from the driving coil 120. Therefore, in order to induce voltage to the sensing coil 130, the magnetic force of line induced from the driving coil 120 needs to be periodically changed. Consequently, the driving coil 120 is supplied with alternating current (AC) from the controller so as to periodically change the induced magnetic line of force.

The sensing coil 130 serves to allow the control unit to calculate coordinates based on the induced voltage. In detail, the sensing coil 130 induces voltage (induced electromotive force) by the magnetic line of force generated from the driving coil 120. In this case, when the magnetic field shielding part 115 embedded in the input unit 110 approaches the sensing coil 130, the magnetic field generated from the driving coil 120 so as to induce voltage to the sensing coil 130 is absorbed or reflected by or from the magnetic field shielding part 115, thereby causing a change in a magnetic flux density or a direction of a magnetic flux. As a result, the voltage induced to the sensing coil 130 is changed, when being compared before the input unit 110 approaches the sensing coil 130. The control unit can confirm variation of voltage to sense coordinates of the input unit 110.

Meanwhile, the driving coil 120 and the sensing 130 may be formed to vertically intersect each other so as to calculate XY coordinates. In detail, the driving coil 120 may be disposed in plural so as to be parallel with each other based on a first axis direction (X-axis direction) and the sensing coil 130 may be disposed in plural so as to be parallel with each other based on a second axis direction (Y-axis direction) vertical to the first axis direction (X-axis direction). However, the driving coil 120 and the sensing coil 130 do not vertically intersect each other, but are enough to vertically intersect each other at at least one portion.

The control unit serves to supply current to the driving coil 120 and measure the voltage induced to the sensing coil 130. In detail, the control unit supplies current so as to induce the magnetic line of force from the driving coil 120 and measures the voltage induced to the sensing coil 130 by the magnetic line of force. Further, when the magnetic field shielding part 115 embedded in the input unit 110 approaches the sensing coil 130, the magnetic flux density or the direction of the magnetic flux of the magnetic field generated from the driving coil 120 are changed by the magnetic field shielding part 115, such that the voltage induced to the sensing coil 130 is changed. The control unit senses the variation of voltage to calculate coordinates.

In addition, the control unit may supply current to the driving coil 120 through time division to measure the voltage induced to the sensing coil 130. For example, when the driving coil 120 is disposed in plural so as to be parallel with each other based on the first axis direction (X-axis direction), the control unit may supply current in an order of first driving coil 120a→second driving coil 120b→third driving coil 120c→fourth driving coil 120d along the second axis direction (Y-axis direction) to induce the magnetic line of force in an order of first driving coil 120a→second driving coil 120b→third driving coil→fourth driving coil 120d. In addition, when the sensing coil 130 is disposed in plural so as to be parallel with each other based on the second axis direction (Y-axis direction), the control unit may measure voltage induced in an order of first sensing coil 130a→second sensing coil 130b→third sensing coil 130c→fourth sensing coil 130d along the first axis direction (X-axis direction).

FIGS. 2 to 7 are diagrams showing an operating process of a digitizer according to the preferred embodiment of the present invention. Hereinafter, the operating process of the digitizer will be described in detail with reference to FIGS. 2 to 7.

As shown in FIGS. 2 to 7, a configuration in which four driving coils 120 are disposed so as to be parallel with each other based on the first axis direction (X-axis direction) and four sensing coils 130 are disposed so as to be parallel with each other based on the second axis direction (Y-axis direction) will be described However, the configuration is only an example for convenience of explanation and therefore, the scope of the present invention is not limited thereto.

Figure 2:
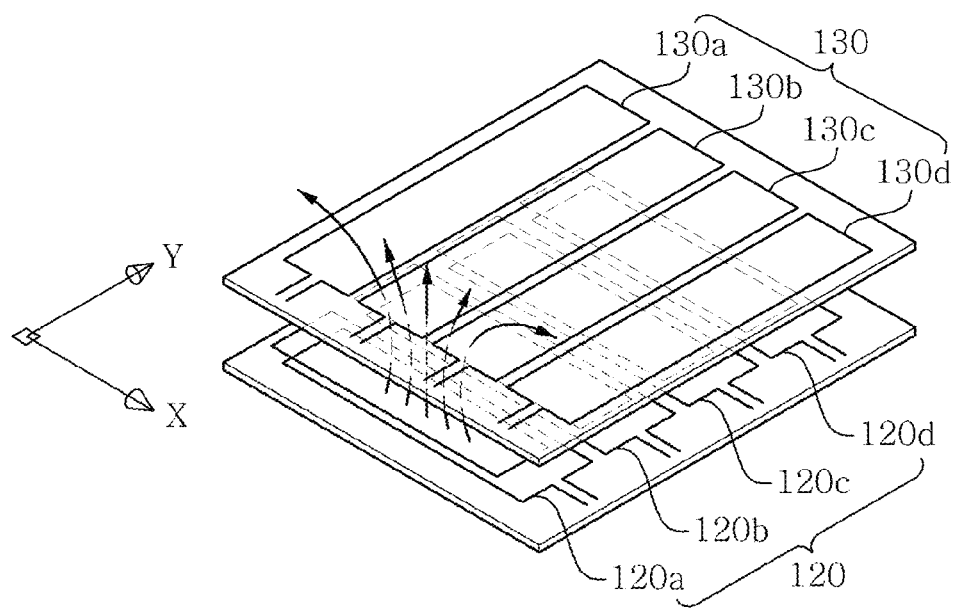
FIGS. 2 to 7 are diagrams showing an operating process of a digitizer according to the preferred embodiment of the present invention.

Referring first to FIG. 2, the control unit supplies current to the first driving coil 120a that is first disposed in the second axis direction (Y-axis direction) among four driving coils 120 to induce the magnetic line of force to the first driving coil 120a. Voltage is induced to four sensing coils 130 by the magnetic line of force. The sensing coil 130 is not affected by the magnetic field shielding part 115 embedded in the input unit 110 and therefore, the voltage induced to the four sensing coils 130 is constant. In this case, the control unit sequentially measures the voltage induced to the four sensing coils 130 along the first axis direction (X-axis direction) to set the induced voltage as a first reference value. That is, the control unit measures the voltage induced in an order of first sensing coil 130a→second sensing coil 130b→third sensing coil 130c→fourth sensing coil 130d to set the voltage induced to the four sensing coils 130 as the first reference value.

Figure 3:
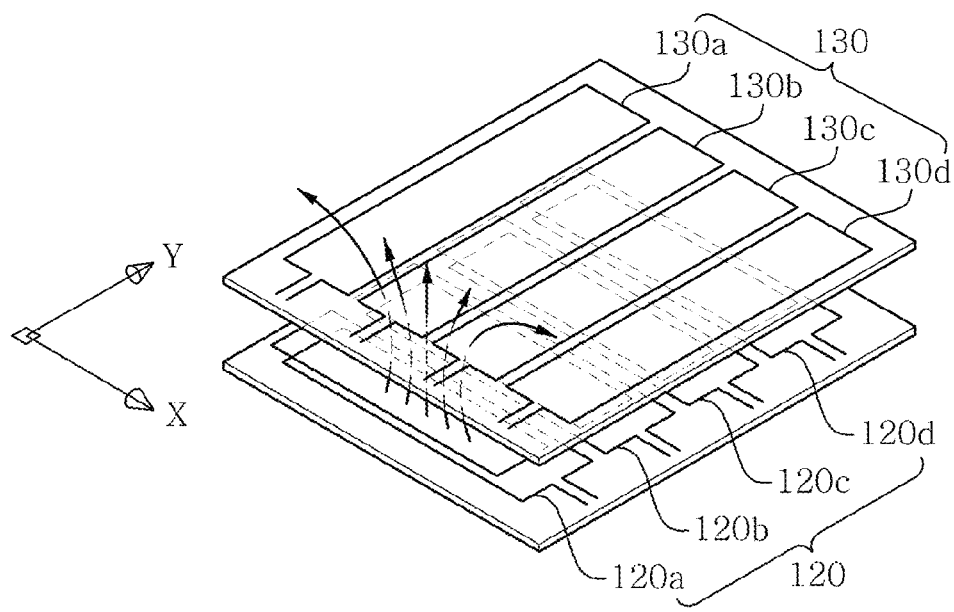

Next, as shown in FIG. 3, the control unit supplies current to the second driving coil 120b to induce the magnetic line of force to the second driving coil 120b. In this case, the control unit measures the voltage induced in an order of first sensing coil 130a→second sensing coil 130b→third sensing coil 130c→fourth sensing coil 130d to set the voltage induced to the four sensing coils 130 as a second reference value.

Figure 4:
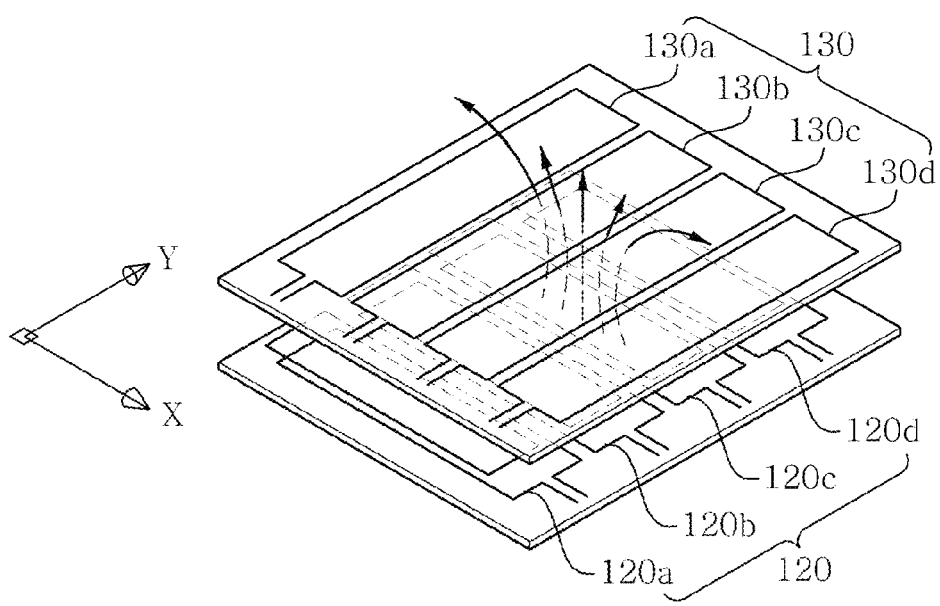

Next, as shown in FIG. 4, the control unit supplies current to the third driving coil 120c to induce the magnetic line of force to the third driving coil 120c. In this case, the control unit measures the voltage induced in an order of first sensing coil 130a→second sensing coil 130b→third sensing coil 130c→fourth sensing coil 130d to set the voltage induced to the four sensing coils 130 as a third reference value.

Figure 5:
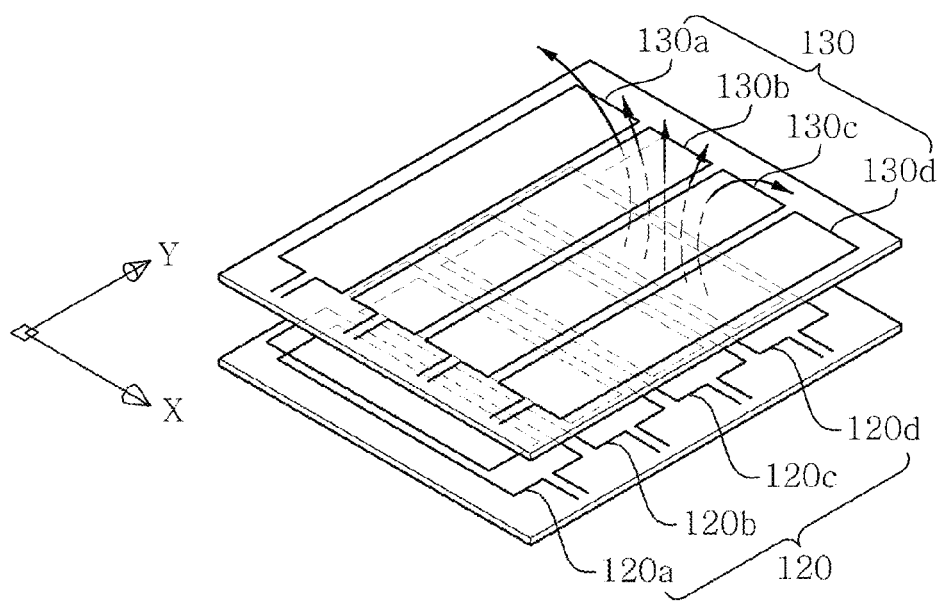

Next, as shown in FIG. 5, the control unit supplies current to the fourth driving coil 120d to induce the magnetic line of force to the fourth driving coil 120d. In this case, the control unit measures the voltage induced in an order of first sensing coil 130a→second sensing coil 130b→third sensing coil 130c→fourth sensing coil 130d to set the voltage induced to the four sensing coils 130 as a fourth reference value.

As described above, the control unit supplies current in an order of first driving coil 120a→second driving coil 120b→third driving coil 120c→fourth driving coil 120d to set the voltage induced to each sensing coil 130 as a reference value and then, as described below, again supplies current in an order of first driving coil 120a→second driving coil 120b→third driving coil 120c→fourth driving coil 120d to calculate coordinates based on the voltage induced to each sensing coil 130.

Figure 6:
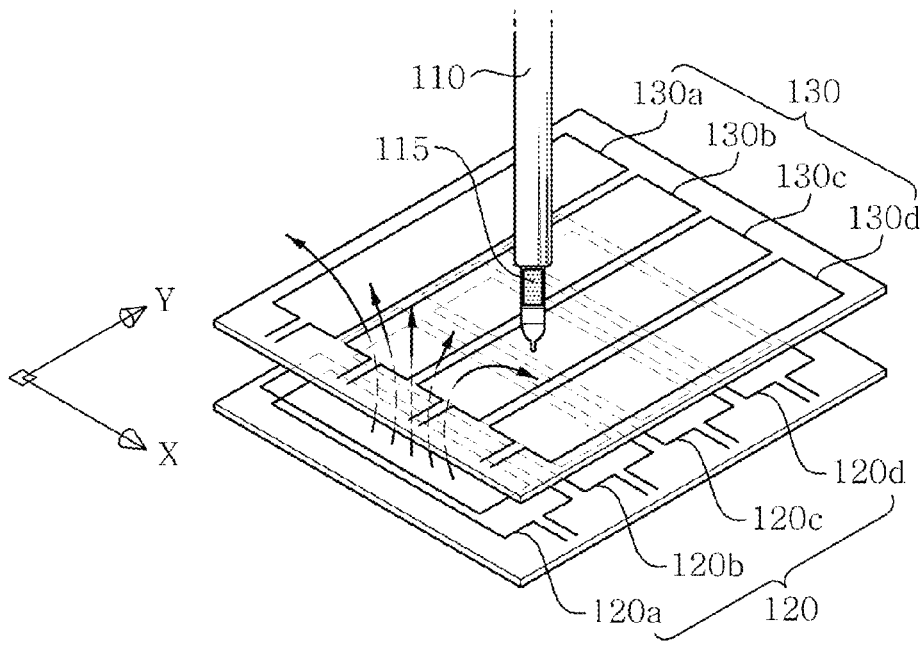

In detail, as shown in FIG. 6, current supplies to the first driving coil 120a to induce the magnetic force of line. Voltage is induced to four sensing coils 130 by the magnetic line of force. The control unit measures four induced voltages in an order of first sensing coil 130a→second sensing coil 130b→third sensing coil 130c→fourth sensing coil 130d. In this case, the magnetic field shielding part 115 embedded in the input unit 110 is disposed over the second driving coil 120b so as to be spaced apart from the first driving coil 120a, thereby preventing the magnetic line of force induced to the first driving coil 120a from being largely shielded. Therefore, variation of the voltage induced to the four sensing coils 130 is also not large. As a result, the control unit compares the variation of voltage induced to the four sensing coils 130 with the foregoing first reference value to determine that the variation of voltage is a predetermined value or less, thereby recognizing that the input unit 100 is not present over the first driving coil 120a.

Figure 7:
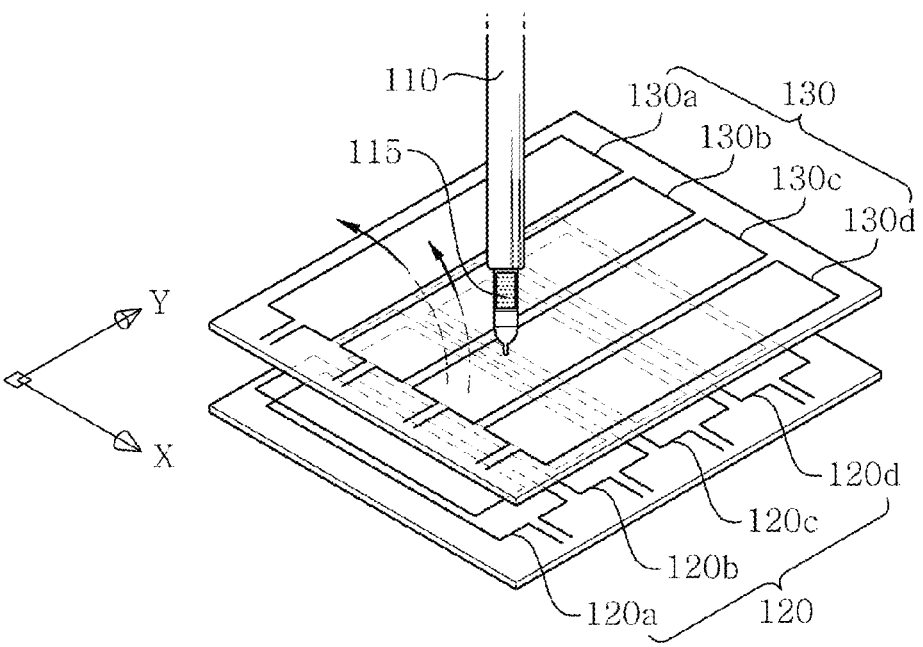

Next, as shown in FIG. 7, current supplies to the second driving coil 120b to induce the magnetic force of line. Voltage is induced to four sensing coils 130 by the magnetic line of force. The control unit measures four induced voltages in an order of first sensing coil 130a→second sensing coil 130b→third sensing coil 130c→fourth sensing coil 130d. In this case, the magnetic field shielding part 115 embedded in the input unit 110 is disposed over a point at which the second driving coil 120b and the third sensing coil 130 intersect each other and therefore, the magnetic field shielding part 115 shields a part of the magnetic line of force passing through the third sensing coil 130c among the magnetic lines of force induced to the second driving coil 120b (see an arrow). Therefore, the third sensing coil 130c among the four sensing coils 130 has the largest variation of induced voltage. The control unit compares the variation of voltage induced to the third sensing coil 130c with the foregoing second reference value to determine that the variation of voltage is a predetermined value or more, thereby recognizing that the input unit 110 is disposed over a point at which the second driving coil 120b and the third sensing coil 130c intersect each other. In this case, the second driving coil 120b is secondly disposed in the second axis direction (Y-axis direction) and the third sensing coil 130c is thirdly disposed in the first axis direction (Y-axis direction) and therefore, the control unit can finally calculate the coordinates of the input unit 110 based on the positional information.

Next, the control unit may perform the process of supplying current to the third driving coil 120c to induce the magnetic line of force and the process of supplying current to the fourth driving coil 120d to induce the magnetic line of force. However, the processes are similar to a process of supplying current to the first driving coil 120a to induce the magnetic line of force and therefore, the description thereof will be omitted.

Meanwhile, the drawings about the preferred embodiments of the present invention show that the driving coil 120 is disposed at the lower portion and the sensing coil 130 is disposed at the upper portion, but the scope of the present invention is not limited thereto. Various embodiments, such as the case in which the driving coil 120 is disposed at the upper portion and the sensing coil 130 is disposed at the lower portion, and the like, may be present.

According to the preferred embodiments of the present invention, it is possible to indicate coordinates even with the stylus pen (input unit) that does not have the complicated internal components such as a coil, a capacitor, and the like. Therefore, the stylus pen can be manufactured lightly and thinly.

Further, according to the preferred embodiments of the present invention, the stylus pen can be easily used and embedded in the mobile devices by being manufactured lightly and thinly.

Moreover, according to the preferred embodiments of the present invention, the stylus pen does not include the separate devices supplying power thereto.

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:
1. A digitizer, comprising:
an input unit having a magnetic field shielding part embedded therein;
a driving coil supplied with current to induce a magnetic line of force;
a sensing coil to which voltage is induced by the magnetic line of force; and
a control unit supplying current to the driving coil and measuring voltage induced to the sensing coil, wherein the control unit senses variation of voltage induced to the sensing coil to calculate coordinates of the input unit when the voltage induced to the sensing coil is changed by the magnetic field shielding part, and wherein a magnetic field formed in the driving coil and inducing the voltage to the sensing coil is absorbed or reflected, a magnetic flux density and a magnetic flux direction are changed, the induced voltage of the sensing coil is changed in comparison with the one before that the input unit approaches, and the driving coil and the sensing coil perpendicularly intersect with each other.

2. The digitizer as set forth in claim 1, wherein the input unit is a stylus pen.

3. The digitizer as set forth in claim 1, wherein the magnetic field shielding part embedded in the input unit is a conductor.

4. The digitizer as set forth in claim 3, wherein the conductor is formed of any one selected from Cu, Fe, Ni, Al, Sn, Zn, Au, and Ag or an alloy of at least two thereof.

5. The digitizer as set forth in claim 1, wherein current supplied to the driving coil by the control unit is alternating current.

6. The digitizer as set forth in claim 1, wherein the driving coil is disposed in plural so as to be parallel with each other based on a first axis direction, and the sensing coil is disposed in plural so as to be parallel with each other based on a second axis direction perpendicular to the first axis direction.

7. The digitizer as set forth in claim 6, wherein the control unit sequentially supplies current to the plurality of driving coils along the second axis direction and sequentially induces the magnetic line of force to the plurality of driving coils along the second axis direction.

8. The digitizer as set forth in claim 6, wherein the control unit measures the voltage sequentially induced to the plurality of sensing coils along the first axis direction.

9. The digitizer as set forth in claim 6, wherein the control unit sets the voltage induced to the sensing coil as a reference value before the voltage induced to the sensing coil is changed by the magnetic field shielding part, and when the voltage induced to the sensing coil is changed by the magnetic field shielding part, compares the voltage with the reference value to sense variation of the voltage induced to the sensing coil.

10. The digitizer as set forth in claim 1, wherein the input unit does not have the coil and the capacitor.

11. The digitizer as set forth in claim 1, wherein the input unit has the magnetic field shielding part only.

* * * * *